(12) United States Patent
Fehrenbach et al.

(10) Patent No.: US 6,404,382 B2
(45) Date of Patent: Jun. 11, 2002

(54) LEVEL TRANSMITTER

(75) Inventors: Josef Fehrenbach, Haslach; Karl Griessbaum, Muhlenbach, both of (DE)

(73) Assignee: Vega Grieshaber KG (DE)

( * ) Notice: Subject to any disclaimer, the term of this patent is extended or adjusted under 35 U.S.C. 154(b) by 0 days.

(21) Appl. No.: 09/961,723

(22) Filed: Sep. 24, 2001

Related U.S. Application Data

(63) Continuation of application No. 09/369,120, filed on Aug. 5, 1999, now Pat. No. 6,310,574.

(51) Int. Cl.⁷ .............................................. G01S 13/08
(52) U.S. Cl. ...................... 342/124; 324/644; 73/290 R
(58) Field of Search ...................... 342/124; 324/644; 73/290 R

(56) References Cited

U.S. PATENT DOCUMENTS

| 4,566,321 | A | | 1/1986 | Zacchio | 73/290 R |
| 4,996,491 | A | | 2/1991 | Vandorpe | 324/644 |
| 5,233,352 | A | | 8/1993 | Cournane | 342/124 |
| 5,507,181 | A | | 4/1996 | Fox et al. | 73/290 V |
| 5,594,449 | A | | 1/1997 | Otto | 342/124 |
| 5,609,059 | A | | 3/1997 | McEwan | 73/290 |
| 5,611,239 | A | | 3/1997 | Klinshteyn | 73/290 V |
| 5,672,975 | A | | 9/1997 | Kielb et al. | 324/644 |
| 5,847,567 | A | | 12/1998 | Kielb et al. | 324/642 |
| 5,851,083 | A | | 12/1998 | Palan | 403/337 |
| 6,107,957 | A | * | 8/2000 | Cramer et al. | 342/124 |
| 6,128,967 | A | * | 10/2000 | Campbell | 73/866.5 |
| 6,166,681 | A | * | 12/2000 | Meszaros et al. | 342/124 |
| 6,310,574 | B1 | * | 10/2001 | Fehrenbach et al. | 342/124 |
| 6,320,532 | B1 | * | 11/2001 | Diede | 342/124 |

FOREIGN PATENT DOCUMENTS

| DE | 19641036 | 7/1998 | G01F/23/284 |
| WO | WO 98/44320 | 10/1998 | G01F/23/00 |
| WO | 01/11323 | 2/2001 | G01F/23/284 |

OTHER PUBLICATIONS

Lang, H., et al., "Smart Transmitter Using Microwave Pulses to Measure the Level of Liquids and Solids in Process Applications", *ISA Paper*, pp. 1–12.

* cited by examiner

*Primary Examiner*—John B. Sotomayor
(74) *Attorney, Agent, or Firm*—Schwegman, Lundberg, Woessner & Kluth, P.A.

(57) ABSTRACT

A level transmitter for use in a process application measures the height of a product level in a container, e.g., in a tank. The level transmitter includes an electromagnetic wave antenna directed into the tank. An electromagnetic wave source sends an electromagnetic wave signal through the electromagnetic wave antenna. An electromagnetic wave receiver receives the reflected electromagnetic wave signal. Measurement circuitry coupled to the source and receiver initiates transmitting of the electromagnetic wave signal and determines product level height based upon the received, reflected signal. Output circuitry transmits information related to product height. The device is suitable for use with containers having very small orifices for antenna insertion.

19 Claims, 4 Drawing Sheets

LEVEL TRANSMITTER

RELATED APPLICATION

This is a continuation under 37 C.F.R. 1.53(b) of U.S. Ser. No. 09/369.120, filed Aug. 5, 1999, now U.S. Pat. No. 6,310,574 which application is made a part hereof by reference.

BACKGROUND OF THE INVENTION

The present invention relates to filling level measurement in industrial and non-industrial processes. More specifically, the present invention relates to measurement of product level height in a storage tank using an electromagnetic wave level gauge.

Preferred instrumentation for the measurement of product level (liquid or solid products) in storage vessels is based on non-contact techniques. One highly preferred non-contact technology is based on the use of microwaves. The basic principle involves transmitting microwaves towards the product surface and receiving reflected microwaves from said surface. The reflected microwaves are analyzed to determine the distance that they have traveled. Knowledge of the distance traveled and storage vessel height allows the determination of product level. Since it is known that the group velocity of electromagnetic waves equals the speed of light in vacuum divided by the square root of the dielectric constant of the corresponding medium in which the wave propagates, the distance that an electromagnetic wave travels can be determined, if the time of travel and the dielectric constant of the medium are known. The time of travel can be determined by measuring the phase shift of the reflected wave in relation to the transmitted wave. Further, the time of travel can be measured by using well-known radar techniques, such as pulse radar or frequency modulated continuous wave (FMCW)-radar.

Prior art microwave level transmitters in the process control industry often work at a frequency of about five to six GHz. They have fairly big antennas and thus need a big orifice in the storage vessel. Generally, an orifice of a diameter of about six inches or more is required for the antenna to be put in. However, a wide orifice in the storage vessel and a large antenna are sources of potential problems, since on the one hand, it is difficult to seal a big orifice tightly, and on the other hand, the transmission of electromagnetic waves by large antennas in storage vessels suffers from the formation of condensate. Also for many storage vessels it is not favorable, or even possible, to create an orifice of about six inches or more.

Therefore, it would be desirable to have a level transmitter small enough, so that the size of the antenna insertion orifice in the storage vessel could be decreased to 1.5 inches or less, particularly to 1 inch or less, or even down to ¾ inch or ½ inch. Such a level transmitter thus needs a small enough antenna, which can fit through the small orifice in the storage vessel.

One solution would be to use a rod antenna. However, the use of rod antennae in storage vessels often has the disadvantage of reduced signal quality. Many containers and storage vessels have insertion orifices provided with more or less extended flanges. Small orifices generally have correspondingly low diameter flanges, through which the rod antenna extends. Problems arise from lateral emission of radiation, which can lead to false echos when the antenna is mounted inside a narrow flange (FIG. 3a). A solution has been described in German Patent DE 196 41 036. A metal casing is provided to surround the rod antenna within the flange (FIG. 3b). However, this prior art solution may cause other problems, through the extended protrusion, of the rod antenna into the vessel, which might cause it to get partly overflown by the product, if a certain filling level is exceeded. In that case, the determination of the filling level might not be as accurate as it was before. Additionally, contact with the vessel contents might cause the forming of condensate on the rod antenna, causing deteriorating performance.

It is not generally possible, however, to use a horn antenna small enough to be insertable in container orifices less than, say, 4 inches, with prior art transmitters, because the antenna can then not transmit 5–6 GHz signals at sufficient quality.

It has now been found that these problems can be solved by combining an antenna small enough to fit into a container orifice with a diameter of less than 4 inches, and often down to less than 1.5 inches, with a transmitter operating at a higher frequency than 6 GHz, and up to 20 GHz and higher.

It has been found to be highly favorable to increase the frequency of the electromagnetic waves used for level measuring, since this not only allows a decrease in the size of the antenna and thus of the orifice in the storage vessel, but also to use a horn antenna with small orifices, which creates less false echos when mounted inside a narrow nozzle and gets less disturbed by artifact signals and condensate, instead of using a rod antenna.

Another kind of antenna which could be used then is the so called microstrip antenna or patch antenna. It consists of an etched conducting structure sitting on a typically round-shaped substrate, as is well known in the semiconductor industry. Since substrate and conducting structure are negligibly thin and the diameter of such an antenna gets very small if the frequency is well above 5.8 GHz, the volume of the antenna is comparatively small. Because of its small volume, it has been found to be highly favorable to use a microstrip antenna if the flange of the storage tank is too short for a horn antenna to fit into it, or if there isn't any flange at all.

By working with a microwave frequency of more than 5.8 GHz, particularly of more than 10 GHz, preferably more than 20 GHz, and particularly preferred of 24 GHz or more, it is possible to decrease the diameter of container orifice and horn antenna to 1.5 inches or less, particularly 1 inch or less, down to ¾ inch or ½ inch, which permits using a threading to seal the level transmitter tightly to the storage vessel, instead of using a flange.

Threadings the size of e.g., about an inch in diameter are easy to make and seal. They are thus preferred, as compared to flange seals required for wide orifices.

For high accuracy in filling level determination, it is crucial for the signal to have a broad absolute bandwidth. Since the absolute signal bandwidth of an antenna is increased by increasing the average driving frequency, an increase of frequency will lead to a more accurate determination of the pathlength the signal has to travel and therefore to a more accurate determination of the filling level in the storage vessel.

SUMMARY OF THE INVENTION

The invention's level transmitter measures the height of a product in a container by using a microwave signal of a frequency of more than 5.8 GHz, particularly more than 10 GHz, preferably more than 20 GHz, and particularly preferred 24 GHz or more.

The level transmitter includes an antenna directed into the container, small enough for it to fit through a container orifice with a diameter of 6 inches or less, particularly 4 inches or less, preferably 1.5 inches or less, and particularly preferred 1 inch or less, down to ¾ inch or even ½ inch. An electromagnetic wave source sends a signal through the antenna into the container. An electromagnetic wave receiver receives a reflected signal. The emitting and receiving antenna may preferably be a horn antenna or a microstrip or patch antenna. Measurement circuitry coupled to the electromagnetic wave source and to the electromagnetic wave receiver initiates transmitting of the signal and determines product height based upon the reflected signal received by the receiver. Output circuitry transmits information related to product height which may be interpreted by an operator or may be coupled to a two wire process control loop for operating automatic filling equipment or the like.

DETAILED DESCRIPTION OF A PREFERRED EMBODIMENT

Figure 1:
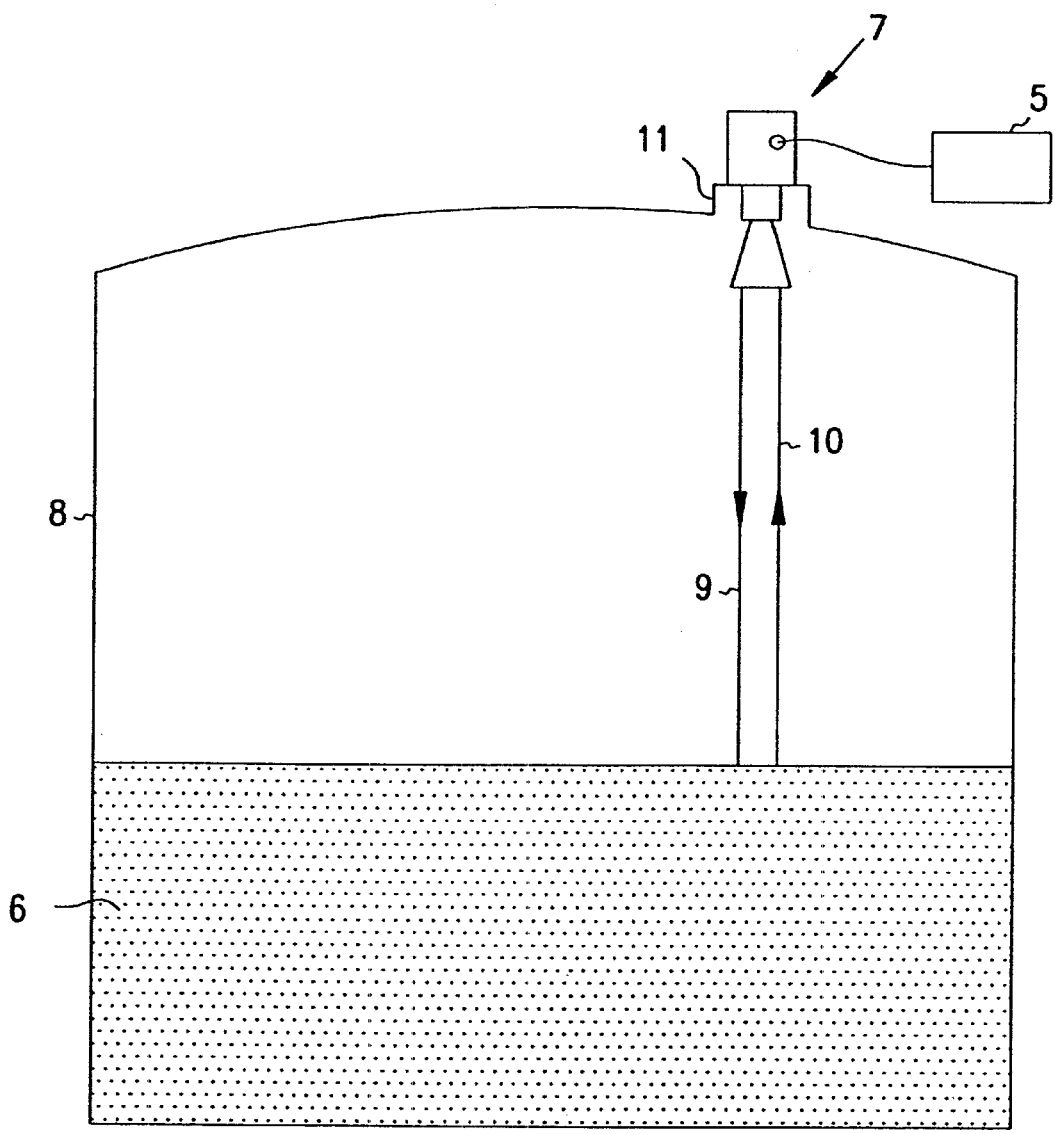
FIG. 1 is a cross sectional drawing of product in a container with the level transmitter mounted thereon.
Figure 2:
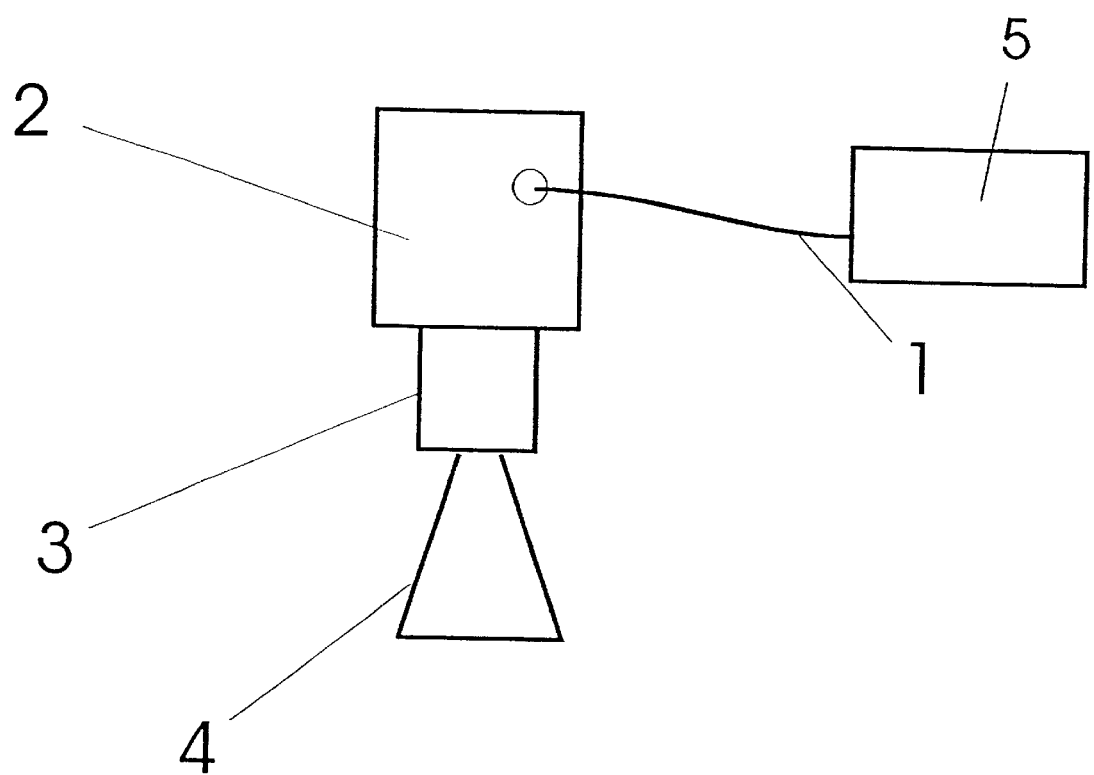
FIG. 2 is a detail view of the level transmitter of FIG. 1.

FIG. 1 is a diagram which shows the level transmitter 7 operably coupled to a storage container or vessel 8, which contains a product 6. The product 6 can be a liquid, a solid or a combination of both. The level transmitter 7, as shown in more detail in FIG. 2, includes housing 2, horn antenna 4 and mechanical means 3 to seal the level transmitter 7 tightly against the storage vessel 8, said means comprising a thread of about 1.5 inches which fits sealingly into orifice 11 of the storage vessel 8. Orifice 11 is provided with a matching threading to sealingly engage the threading comprised by mechanical means 3.

The horn antenna 4 emits a microwave signal 9 with a frequency of 24 GHz, which is reflected at the surface of product 6 and received by an electromagnetic wave receiver in housing 2. Measurement circuitry in housing 2 coupled to the electromagnetic wave source in housing 2 and to the electromagnetic wave receiver in housing 2 initiates transmitting of the signal 9 and determines product 6 height based upon the reflected signal 9, 10 received by the receiver in housing 2.

In accordance with the invention, the level transmitter 7 transmits information related to product 6 height over wire 1 to output device 5. One form of output device 5 may be a meter or display for an operator while in another embodiment the output may be an electrical signal for use in a two wire process control loop.

Electric circuitry carried in housing 2 includes measurement and output circuitry.

The design of measurement and output circuitry is well known and not part of the invention (see ISA paper entitled "Smart Transmitter Using Microwave Pulses to Measure The Level Of Liquids and Solids In Process Applications," by Hugo Lang and Wolfgang Lübcke of Endress and Hauser GmbH and Company, Maulburg, Germany. See also U.S. Pat. 5,672,975, all incorporated herein by reference).

Figures 3A, 3B, 3C:
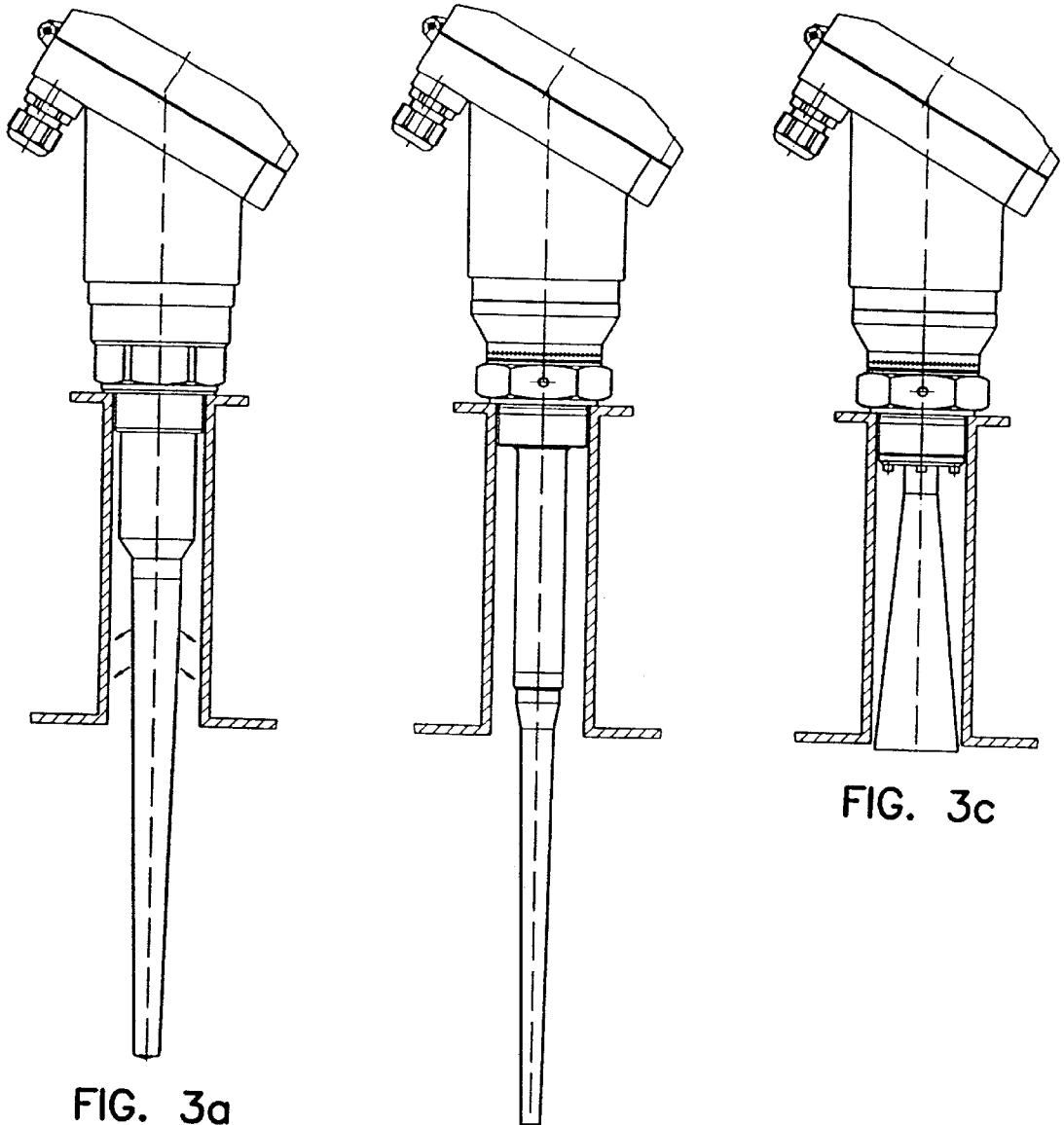
FIG. 3a is a detail view of a prior art rod antenna mounted inside a narrow flange shown in section.
FIG. 3b is a detail view of a prior art rod antenna with a metal casing enclosing the portion of the rod within the narrow flange.
FIG. 3c is a detail view of a horn antenna according to the present invention with substantially its entire length enclosed within the narrow flange.

FIG. 3c shows an inventive 24 GHz horn antenna, replacing a rod antenna in the context described in German Patent 196 41 036, incorporated herewith by reference.

Although the present invention has been described with reference to preferred embodiments, workers skilled in the art will recognize that changes may be made in form and detail without departing from the spirit and scope of the invention.

Figure 4A:
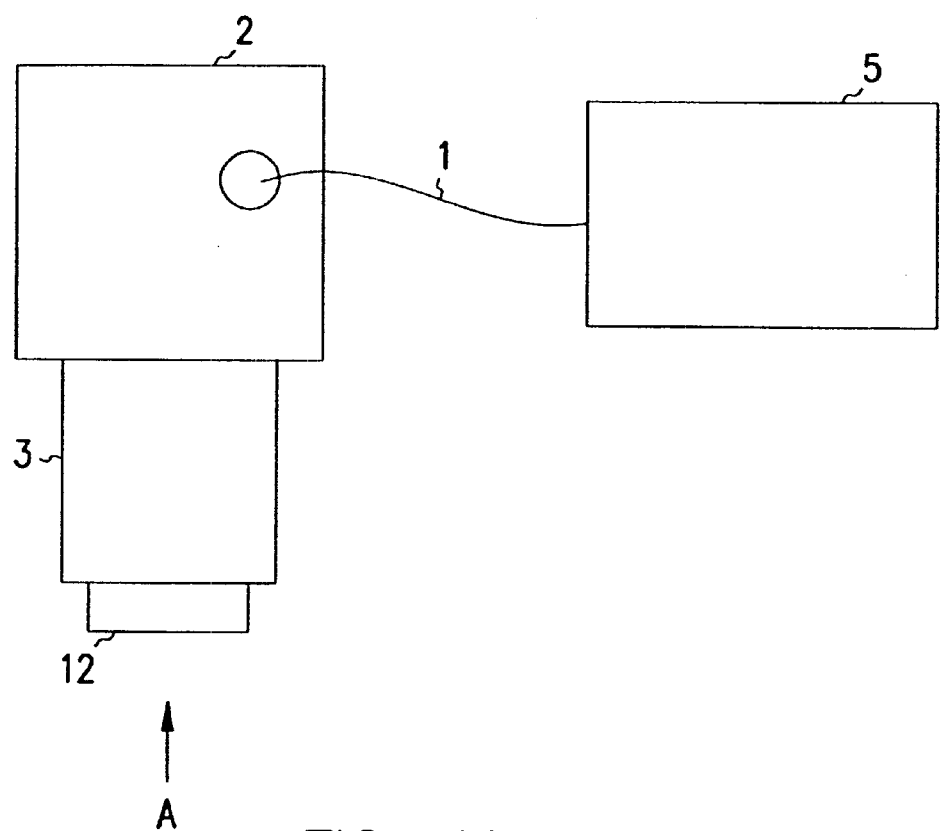
FIG. 4a is a detail side elevation view of another embodiment of the level transmitter.
Figure 4B:
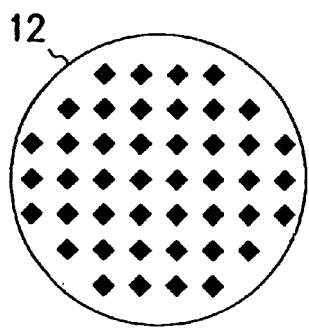
FIG. 4b is an enlarged detail view of the surface of the antenna.

Thus, the antenna may in certain cases be a rod antenna or, more preferably for some installations, a microstrip or "patch" antenna 12 as is shown in FIGS. 4a and 4c. In FIG. 4a the patch or microstrip antenna portion 12 is mounted on mechanical means 3 which is in turn connected to housing 2. An enlarged detailed view of the patch antenna 12, looking at the antenna along the line A of FIG. 4a, shows the surface of the substrate upon which the pattern of the microstrip or patch antenna may be seen. Because the patch antenna 12 is so small, it cab be mounted readily in an orifice 11 as generally illustrated in FIG. 1. Because the strip antenna is extremely compact and its volume is small it is particularly suitable for applications where the storage tank is too short to accept a horn antenna or in situations where the orifice 11 of container 8 is on a very short flange extension of the container.

In order to meet the needs of particular installations, the microwave frequency may be lower or, more preferably, higher than 24 GHz.

What is claimed is:

1. A device using microwaves for measuring the height of a product in a storage vessel having an orifice therein, the orifice having a first thread, the device comprising:

a microwave source creating waves with a frequency of at least about 24 GHZ;

a microwave antenna operatively coupled to the microwave source and mounted at the orifice for sending the microwaves into the storage vessel and for receiving a reflected wave from the container, the orifice having a diameter of less than 4 inches, wherein the microwave antenna includes one of a horn antenna and a microstrip antenna;

a microwave receiver operatively coupled to the antenna for receiving the reflected wave from surface of the product within the storage vessel and transmitting an output signal indicative of the level of the product; and a second thread for engaging the first thread of the orifice of the storage vessel to connect the device to the storage vessel.

2. The device of claim 1, wherein the first thread and the second thread match such that the orifice is sealingly closed, wherein the microwave antenna faces the product in the storage vessel, and wherein the microwave source and the microwave receiver are located outside the storage vessel.

3. The device of claim 1, wherein substantially all of the length of the microwave antenna is enclosed within a nozzle which is attached to the container and communicates with the orifice to deliver electromagnetic waves into the container.

4. The device of claim 1, wherein the microwave source is a low power source and the receiver is a low power receiver, and wherein circuitry is provided to transmit product level information signal to an output device connected in a two-wire process control loop.

5. The device of claim 1, wherein the orifice includes a diameter that is less than about 1.5 inches.

6. The device of claim 1, wherein the orifice includes a diameter that is less than 1 inch.

7. The device of claim 1, wherein the orifice includes a diameter that is less than ¾ inch.

8. The device of claim 1, wherein the orifice includes a diameter that is less than ½ inch.

9. The device of claim 1, wherein the orifice includes an area substantially less than a surface area of the product in the storage vessel.

10. A storage vessel for storing a product, comprising:
   a container having an orifice, the orifice having a first thread and a diameter of less than four inches;
   a level sensor including:
      a microwave source creating waves of at least 20 GHZ;
      an antenna operatively coupled to the microwave source, the antenna sending the waves into the container through the orifice, wherein the antenna includes one of a horn antenna and a microstrip antenna;
      a microwave receiver operatively coupled to the antenna, the receiver receiving a reflected wave from a surface of the product in the container; and
      a second thread for engaging the first thread;
   wherein the level sensor is mounted at the container by matching the first thread and the second thread such that the antenna faces the product in the container, and wherein the microwave source and the microwave receiver are located outside the container.

11. The vessel of claim 10, wherein the microwave source creates waves of a frequency of at least 24 GHZ.

12. The vessel of claim 10, wherein the receiver transmits an output signal indicative of the level of the product in the container.

13. The vessel of claim 10, further comprising means for sealingly connecting at least one of the microwave source, the antenna and the receiver to the container.

14. The vessel of claim 10, wherein at least one of the microwave source, the antenna and the receiver includes the second thread, and wherein the first thread engages the second thread to sealingly connect the at least one of the microwave source, the antenna and the receiver to the container.

15. The vessel of claim 10, wherein the orifice includes a diameter that is less than about 1.5 inches.

16. The vessel of claim 10, wherein the orifice includes a diameter that is less than 1 inch.

17. The vessel of claim wherein the orifice includes a diameter that is less than ¾ inch.

18. The vessel of claim 10, wherein the orifice includes a diameter that is less than ½ inch.

19. The vessel of claim 10, wherein the orifice includes an area substantially less than a surface area of the product in the container.

* * * * *